(12) United States Patent
Berdut-Teruel

(10) Patent No.: US 12,549,048 B1
(45) Date of Patent: Feb. 10, 2026

(54) CONVERTER OF STATIC MAGNETIC ENERGY INTO DYNAMIC MECHANICAL ENERGY USING COMPOSITE FERROUS CAP WINDINGS

(71) Applicant: Elberto Berdut-Teruel, San Juan, PR (US)

(72) Inventor: Elberto Berdut-Teruel, San Juan, PR (US)

(*) Notice: Subject to any disclaimer, the term of this patent is extended or adjusted under 35 U.S.C. 154(b) by 0 days.

(21) Appl. No.: 18/926,420

(22) Filed: Oct. 25, 2024

Related U.S. Application Data

(63) Continuation-in-part of application No. 18/423,737, filed on Jan. 26, 2024.

(51) Int. Cl.
| | | |
|---|---|---|
| *H02K 15/035* | (2025.01) | |
| *H02K 1/14* | (2006.01) | |
| *H02K 3/30* | (2006.01) | |
| *H02K 3/32* | (2006.01) | |
| *H02K 7/075* | (2006.01) | |
| *H02K 33/16* | (2006.01) | |

(52) U.S. Cl.
CPC ............... *H02K 3/30* (2013.01); *H02K 1/146* (2013.01); *H02K 3/325* (2013.01); *H02K 7/075* (2013.01); *H02K 15/035* (2025.01); *H02K 33/16* (2013.01)

(58) Field of Classification Search
CPC ...... H02K 33/16; H02K 35/02; H02K 15/035; H02K 15/03; H02K 15/026; H02K 15/028; H02K 7/06; H02K 7/075; H02K 3/30; H02K 3/325; H02K 1/146
USPC ....................... 310/43, 15, 20, 23, 30, 12.14
See application file for complete search history.

(56) References Cited

U.S. PATENT DOCUMENTS

| | | | | |
|---|---|---|---|---|
| 2,754,440 | A  * | 7/1956 | Brainard ................ | H02K 1/276 335/284 |
| 6,049,146 | A  * | 4/2000 | Takara ...................... | F03G 7/00 310/23 |
| 2009/0195114 | A1* | 8/2009 | Ikeya ...................... | H02K 1/146 310/216.091 |
| 2011/0048821 | A1* | 3/2011 | Dial ........................ | B60L 15/20 310/46 |
| 2012/0169147 | A1* | 7/2012 | Kirma .................... | H02K 33/14 310/20 |
| 2012/0242174 | A1* | 9/2012 | Wilson ................... | H02K 35/04 310/23 |
| 2014/0191595 | A1* | 7/2014 | Miles ..................... | H02K 35/02 310/20 |
| 2016/0322881 | A1* | 11/2016 | Andrews ................ | H02K 7/025 |
| 2018/0212483 | A1* | 7/2018 | Baba ....................... | H02K 1/276 |

\* cited by examiner

*Primary Examiner* — Michael Andrews
(74) *Attorney, Agent, or Firm* — Luis Figarella

(57) ABSTRACT

A device capable of converting static magnetic energy into dynamic mechanical energy equipped with composite ferrous cap windings are discussed which utilize phenolic, non-ferrous and ferrous metals in combination with improved geometrical shapes to create a lightweight and highly efficient assembly that utilizes the natural attraction of ferrous materials to magnets to generate mechanical motion with minimal energy involvement.

6 Claims, 22 Drawing Sheets

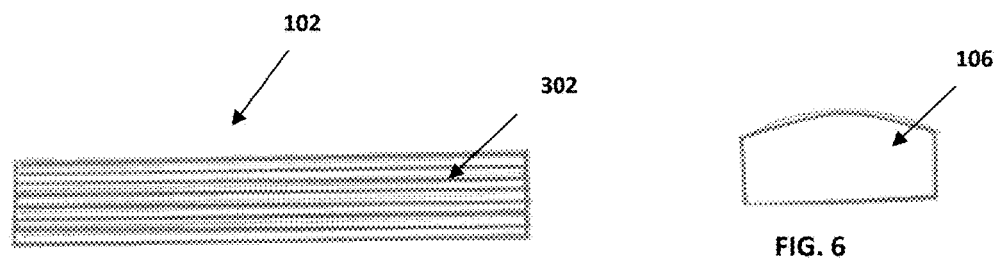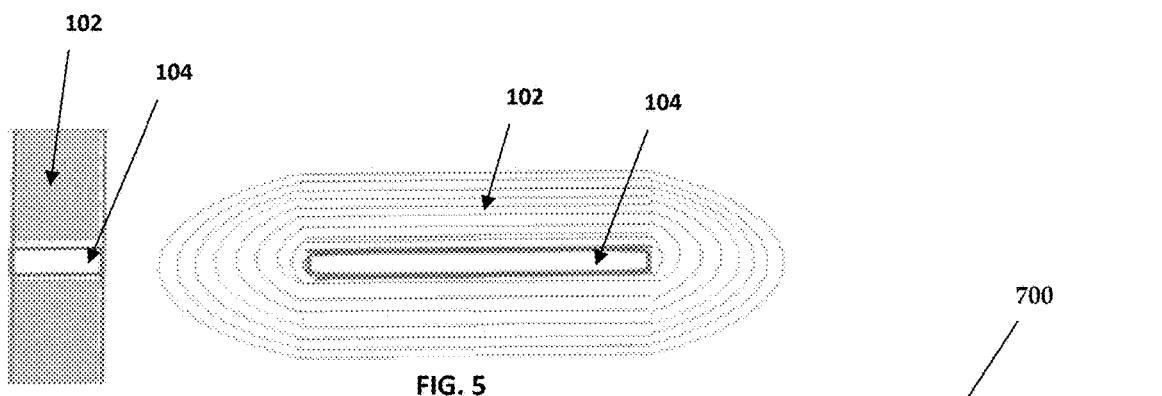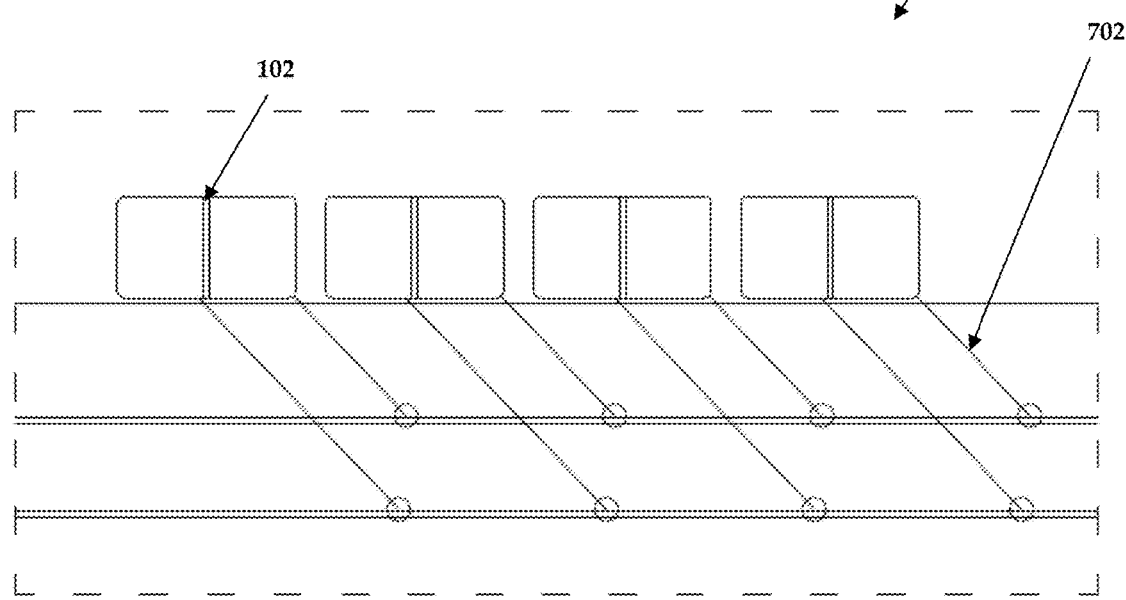
FIG. 3
FIG. 6
FIG. 4
FIG. 5
FIG. 7

CONVERTER OF STATIC MAGNETIC ENERGY INTO DYNAMIC MECHANICAL ENERGY USING COMPOSITE FERROUS CAP WINDINGS

CROSS-REFERENCE TO RELATED APPLICATIONS

This application is a continuation in part of co-pending U.S. non-provisional patent application Ser. No. 18/423,737 titled "Converter of Static Magnetic Energy into Dynamic Mechanical Energy filed on Jan. 26, 2024, the disclosure of which is herein incorporated by reference in its entirety.

PATENTS CITED

The following documents and references are incorporated by reference in their entirety, Liu Jinfeng CN105946594A, Berdut (U.S. Pat. Nos. 561,518, 8,018,116 and 11,984,761) and Baca et al (U.S. Pat. No. 7,868,476).

FIELD OF THE INVENTION

The disclosure relates to a machine that converts static magnetic energy into dynamic mechanical energy via rotational motion, and specifically to a converter of said static magnetic energy into dynamic mechanical energy via phenolic and ferromagnetic materials in magnetic balance and motion that uses lightweight and highly efficient composite material winding assemblies for electrical generators.

DESCRIPTION OF THE RELATED ART

Electrical-based mechanical motion is traditionally generated from motors that turn a shaft connected to a rotor, utilizing electrically generated magnetic fields to attract permanent magnets or electro-magnets. Traditional motors have windings comprised of conductive wires, but are primarily comprised of ferrous metals. The core for these windings has been traditionally made of iron.

The use of ferromagnetic metal components in the motors results in inherent parasitic losses of magnetic energy efficiency, which result in significant energy being internally consumed to fight these parasitic magnetic forces created within all the ferrous materials when the motor is standing. These have been historically accepted penalties, but newer market requirements and applications, combined with the constant desire to improve efficiencies, have resulted in the need for alternatives.

Electric generators and motors have windings comprised of conductive wires that are wrapped around a metallic core. The core for these windings has been traditionally made of iron. The conductive wires, typically made from copper, aluminum or a mixture, provide an electrical path for the current that is created as the windings are subjected to alternating magnetic fields to flow (whether those of a permanent magnet or those from electro-magnetic fields). To create these magnetic fields, the rotor or armature is spun.

While the use of ferromagnetic cores for the windings is traditional, these cores have two primary performance penalties. The first is their weight, the second is the induced magnetic polarity, resulting from the time the core is exposed to a N or S polarity of the permanent magnets while stopped. Both have been historically accepted penalties, but newer market requirements and applications, combined with the constant desire to improve efficiencies, have resulted in the need for alternatives.

What is needed, is a machine that eliminates all these parasite losses and converts the inherent potential magnetic energy in magnets into dynamic rotational mechanical energy through the use of phenolic windings that are in electro-magnetic balance with permanent magnetic forces, in combination with an improved winding for generator applications where improved performance and lighter weight may be achieved. In such a fashion, a minimal amount of electric energy is required to maintain machine rotation.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a converter of static magnetic energy into dynamic mechanical energy having composite ferrous cap winding, said converter comprising a central rotor structure comprised of phenolic and non-phenolic materials having magnetic field generating components, wherein said magnetic field generating materials are comprised of permanent magnets, a stator structure comprised of phenolic and non-phenolic materials having composite ferrous cap windings, a shaft connected to said rotor and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly and electrical control circuits so that each said composite ferrous cap windings can receive current in the appropriate direction and based on the shaft position so as to create a magnetic field around said composite ferrous cap windings that cancels the attraction of the magnet said ferrous portion just passed. In another aspect, said winding wire is comprised of all or part of: copper, aluminum or a mixture of either. In yet another aspect all the magnets within the rotor are the same polarity. In another aspect the magnets within the rotor are of alternate polarity sequentially along the rotor.

In one aspect the invention is about a converter of static magnetic energy into dynamic mechanical energy having composite ferrous cap winding, said converter comprising a central rotor structure comprised of phenolic and non-phenolic materials having composite ferrous cap windings, a stator structure comprised of phenolic and non-phenolic materials having magnetic field generating components, wherein said magnetic field generating materials are comprised of permanent magnets, a shaft connected to said rotor and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly and electrical control circuits so that each said composite ferrous cap windings can receive current in the appropriate direction and based on the shaft position so as to create a magnetic field around said composite ferrous cap windings that cancels the attraction of the magnet said ferrous portion just passed. In another aspect, said winding wire is comprised of all or part of: copper, aluminum or a mixture of either. In yet another aspect all the magnets within the rotor are the same polarity. In another aspect the magnets within the rotor are of alternate polarity sequentially along the rotor.

In one aspect the invention is about a method to generate torque on a shaft using a converter of static magnetic energy into dynamic mechanical energy having composite ferrous cap winding, said method comprising providing a central rotor structure comprised of phenolic and non-phenolic materials having magnetic field generating components, wherein said magnetic field generating materials are comprised of permanent magnets, providing a stator structure comprised of phenolic and non-phenolic materials having composite ferrous cap windings, providing a shaft connected to said rotor and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly, providing electrical control circuits so that each said composite ferrous cap windings can receive current in the appropriate direction and based on the shaft position so as to create a magnetic field around said composite ferrous cap windings that cancels the attraction of the magnet said ferrous portion just passed and operating said external mechanical rotation component. In another aspect, said winding wire is comprised of all or part of: copper, aluminum or a mixture of either. In yet another aspect all the magnets within the rotor are the same polarity. In another aspect the magnets within the rotor are of alternate polarity sequentially along the rotor.

In one aspect, the invention is about a converter of static magnetic energy into dynamic mechanical energy having composite ferrous cap winding, said converter comprising a central rotor structure comprised of phenolic and non-phenolic materials having magnetic field generating components placed along the fascia of said central rotor, wherein said magnetic field generating materials are comprised of permanent magnets, a stator structure comprised of phenolic and non-phenolic materials having composite ferrous cap windings placed along the internal fascia of said stator structure, a shaft connected to said rotor and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly and electrical control circuits so that each said composite ferrous cap windings can receive current in the appropriate direction and based on the shaft position so as to create a magnetic field around said composite ferrous cap windings that cancels the attraction of the magnet said ferrous portion just passed. In another aspect said winding wire is comprised of all or part of: copper, aluminum or a mixture of either. In yet another aspect all the magnets within the rotor are the same polarity. In another aspect all the magnets within the rotor are the same polarity. In another aspect the magnets within the rotor are of alternate polarity sequentially along the rotor. In yet another aspect the magnets within the rotor are of alternate polarity sequentially along the rotor.

In one aspect, the invention is about a converter of static magnetic energy into dynamic mechanical energy having composite ferrous cap winding, said converter comprising a central rotor structure comprised of phenolic and non-phenolic materials having composite ferrous cap windings components placed along the fascia of said central rotor, a stator structure comprised of phenolic and non-phenolic materials having magnetic field generating components placed along the internal fascia of said stator structure, wherein said magnetic field generating materials are comprised of permanent magnets, a shaft connected to said rotor and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly and electrical control circuits so that each said composite ferrous cap windings can receive current in the appropriate direction and based on the shaft position so as to create a magnetic field around said composite ferrous cap windings that cancels the attraction of the magnet said ferrous portion just passed. In another aspect said winding wire is comprised of all or part of: copper, aluminum or a mixture of either. In yet another aspect all the magnets within the rotor are the same polarity. In another aspect all the magnets within the rotor are the same polarity. In another aspect the magnets within the rotor are of alternate polarity sequentially along the rotor. In yet another aspect the magnets within the rotor are of alternate polarity sequentially along the rotor.

In one aspect, the invention is about a method to generate torque on a shaft using a converter of static magnetic energy into dynamic mechanical energy having composite ferrous cap winding, said method comprising providing a central rotor structure comprised of phenolic and non-phenolic materials having magnetic field generating components placed along the fascia of said central rotor, wherein said magnetic field generating materials are comprised of permanent magnets, providing a stator structure comprised of phenolic and non-phenolic materials having composite ferrous cap windings placed along the internal fascia of said stator structure, providing a shaft connected to said rotor and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly, providing electrical control circuits so that each said composite ferrous cap windings can receive current in the appropriate direction and based on the shaft position so as to create a magnetic field around said composite ferrous cap windings that cancels the attraction of the magnet said ferrous portion just passed and operating said external mechanical rotation component. In another aspect said winding wire is comprised of all or part of: copper, aluminum or a mixture of either. In yet another aspect all the magnets within the rotor are the same polarity. In another aspect all the magnets within the rotor are the same polarity. In another aspect the magnets within the rotor are of alternate polarity sequentially along the rotor. In yet another aspect the magnets within the rotor are of alternate polarity sequentially along the rotor.

In one aspect, the invention is about a converter of static magnetic energy into dynamic mechanical energy having composite ferrous cap winding, said converter comprising a central rotor structure comprised of phenolic and non-phenolic materials having magnetic field generating components, wherein said magnetic field generating materials are comprised of permanent magnet components placed inside a sleeve having an extending rod connected to a camshaft, a stator structure comprised of phenolic and non-phenolic materials having composite ferrous cap winding components placed outside said sleeve to form a stator structure, a shaft connected to said camshaft and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly and electrical control circuits so that each said composite ferrous cap windings can receive current in the appropriate direction and based on the shaft position so as to create a magnetic field around said composite ferrous cap windings that cancels the attraction of the magnet said ferrous portion just passed. In another aspect said winding wire is comprised of all or part of: copper, aluminum or a mixture of either. In yet another aspect all the magnets within the rotor are the same polarity. In another aspect all the magnets within the rotor are the same polarity. In another aspect the magnets within the rotor are of alternate polarity sequentially along the rotor. In yet another aspect the magnets within the rotor are of alternate polarity sequentially along the rotor.

In one aspect, the invention is about a converter of static magnetic energy into dynamic mechanical energy having composite ferrous cap winding, said converter comprising a central rotor structure comprised of phenolic and non-phenolic materials having composite ferrous cap winding components placed inside a sleeve having an extending rod connected to a camshaft, a stator structure comprised of phenolic and non-phenolic materials having magnetic field generating components placed outside said sleeve to form a stator structure, wherein said magnetic field generating materials are comprised of permanent magnets, a shaft connected to said camshaft and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly and electrical control circuits so that each said composite ferrous cap windings can receive current in the appropriate direction and based on the shaft position so as to create a magnetic field around said composite ferrous cap windings that cancels the attraction of the magnet said ferrous portion just passed. In another aspect said winding wire is comprised of all or part of: copper, aluminum or a mixture of either. In yet another aspect all the magnets within the rotor are the same polarity. In another aspect all the magnets within the rotor are the same polarity. In another aspect the magnets within the rotor are of alternate polarity sequentially along the rotor. In yet another aspect the magnets within the rotor are of alternate polarity sequentially along the rotor.

In one aspect, the invention is about a method to generate torque on a shaft using a converter of static magnetic energy into dynamic mechanical energy having composite ferrous cap winding, said method comprising providing a central rotor structure comprised of phenolic and non-phenolic materials having magnetic field generating components placed inside a sleeve having an extending rod connected to a camshaft, wherein said magnetic field generating materials are comprised of permanent magnets placed outside said sleeve to form a stator structure, providing a stator structure comprised of phenolic and non-phenolic materials having composite ferrous cap windings, providing a shaft connected to said camshaft and coupled to external mechanical rotation components, said shaft containing mechanical/electronic components to determine said shaft rotation position, wherein said composite ferrous cap windings are each comprised of a coil winding assembly formed by a tightly coiled conductive insulated wire that is wound in a smooth oval pattern with no sharp turns and then dipped in a resin, plus a ferrous metal 'T' insert structure placed within the center of said winding assembly, providing electrical control circuits so that each said composite ferrous cap windings can receive current in the appropriate direction and based on the shaft position so as to create a magnetic field around said composite ferrous cap windings that cancels the attraction of the magnet said ferrous portion just passed and operating said external mechanical rotation component. In another aspect said winding wire is comprised of all or part of: copper, aluminum or a mixture of either. In yet another aspect all the magnets within the rotor are the same polarity. In another aspect all the magnets within the rotor are the same polarity. In another aspect the magnets within the rotor are of alternate polarity sequentially along the rotor. In yet another aspect the magnets within the rotor are of alternate polarity sequentially along the rotor.

Other features and advantages of the present invention will become apparent upon examining the following detailed description of an embodiment thereof, taken in conjunction with the attached drawings, which are provided for purposes of illustration and not of limitation.

BRIEF DESCRIPTION OF THE DRAWINGS

FIG. 3 illustrates a side view of a proposed composite block winding for electrical generators, according to an exemplary embodiments of the invention.

FIG. 4 illustrates a side view of a proposed composite block winding for electrical generators, according to an exemplary embodiments of the invention.

FIG. 5 illustrates a top view of a proposed composite block winding for electrical generators, according to an exemplary embodiments of the invention.

FIG. 6 illustrates a side view of a permanent magnet for electrical generators, according to an exemplary embodiments of the invention.

FIG. 7 illustrates the electrical connection of the output of the proposed windings for electrical generators, according to an exemplary embodiments of the invention.

Figure 1:
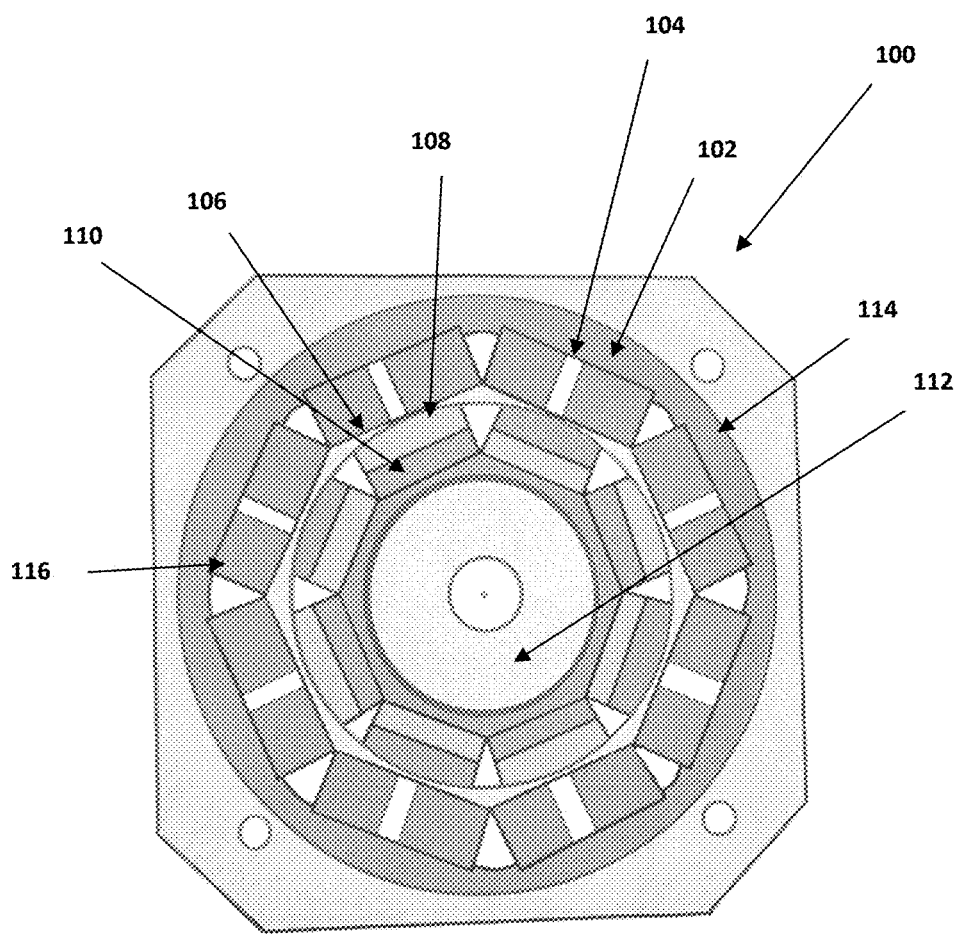
FIG. 1 illustrates a cross-section view of a proposed generator using the proposed composite block windings, according to exemplary embodiments of the invention.
Figure 2:
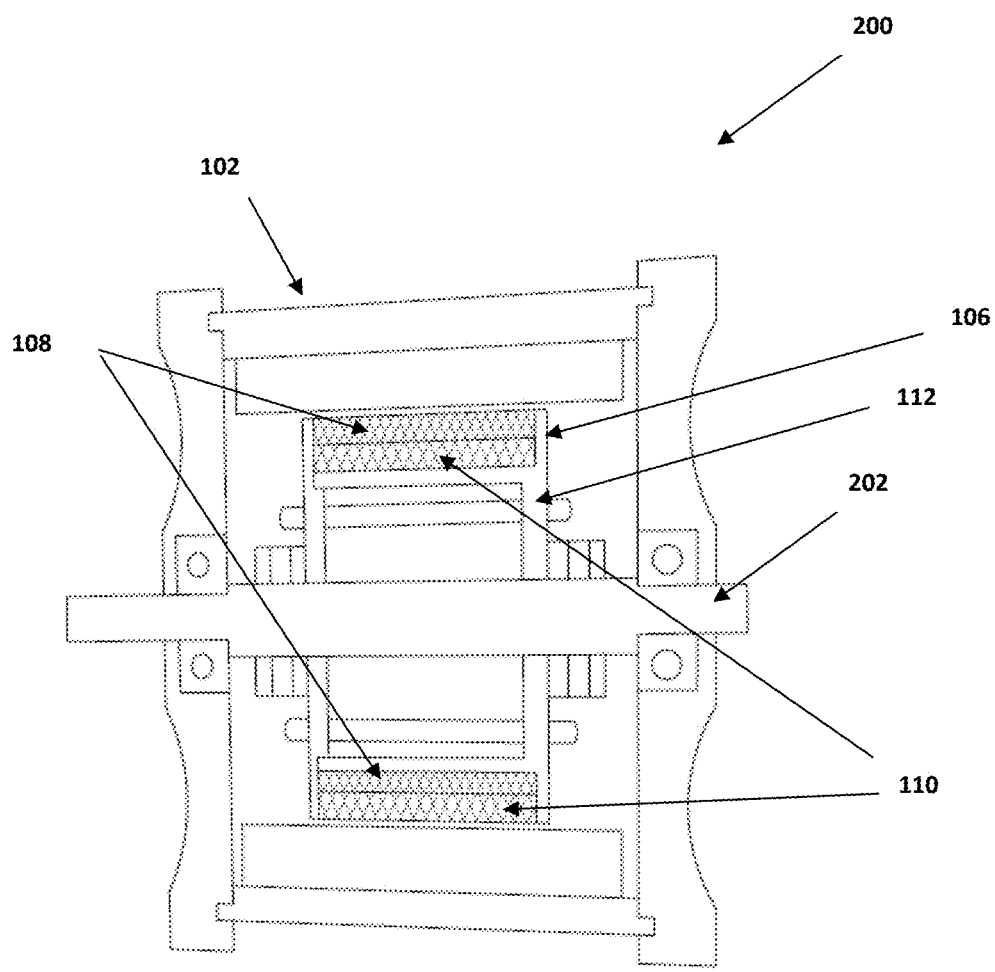
FIG. 2 illustrates a cross-section side view of a proposed generator using the proposed composite block windings, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

The present invention, referring to FIGS. 1-6 illustrate the various embodiments of the proposed devices using the proposed composite or block-type windings 102. In one proposed embodiment, a generator 100 is comprised of a multiplicity of block-type windings 102, each comprised of an individual insulated wire 302 that is wound around a central area 104 and then covered in resin, so as to form a block 102. The wire 302 may be comprised of copper, aluminum or a combination.

The central area 104 of the winding 102 may be left open, or alternatively filled with a phenolic material or other possible preferably non-ferrous metals (again, copper, stainless steel, aluminum, lead), non-ferrous polymers (including amorphous as well as semi-crystalline plastics), ceramics, wood, fiberglass, carbon fiber composites, epoxy composites and others.

Some of the trade names for the above materials include PromoSpire, Torlon, AvaSpire, Amodel and their competitors. Some of these phenolic materials are a usually thermosetting resins or plastics made by condensation of a phenol with an aldehyde and used especially for molding and insulating and in coatings and adhesives.

In one embodiment, the central area 104 of the winding 102 may be left open or filled with a phenolic material. The central area 104 may assist in affixing the winding 102 to the stator 114 assembly.

In one embodiment 100, the wingdings 102 are attached to the stator 114, which itself may be comprised of phenolic materials. Similarly, all or parts of the rotor 112 are comprised of phenolic materials. We note, that particularly for generators, the almost complete elimination of ferrous metals has shown to have advantages.

Note that while the generator 100 has permanent magnets 106, with N-pol 108 or S-pol 110 polarity, a similar effect may be achieved by using electromagnets or electric magnets within the stator 114 or rotor 112. These electric magnets are powered so that the N-pol 108/S-pol 110 magnetic field is generated as the rotor 112 rotates, or alternatively a rotation is created by the variation of the magnetic field electronically.

In one embodiment, the rotor 112 is rotated via a mechanical coupling of the rotor shaft 202 to an external rotation component, such as a propeller hub, engine shaft, wheel axle, turbine (steam or jet) shaft, etc.

In one embodiment, 1000, the magnets 106 within the core are alternated in surface polarity, so that the N 108 occupies all the exposed surface from the magnet in the rotating core 112, while the next magnet position will be completely S-polarity 110. A side view of the permanent magnet 602 shows how the pieces will interact with each other.

As seen in the side view 200, the rotation of the rotor 112 moves the magnetic fields from the magnets 106 across the wires 302 within the winding 102, causing the voltage to be induced across the wire 302, which is then electrically connected outside the chassis 200.

The generator described above is capable of significant weight advantages, since the complete structure is made of lightweight non-ferrous and phenolic materials, instead of heavy ferrous metals. In addition, overtime, ferrous metals tend to 'adopt' the magnetic polarity of whatever permanent magnet they are exposed to. Many of us have screwdrivers with 'adopted' magnetism, not always a desired quality.

Figures 12, 13:
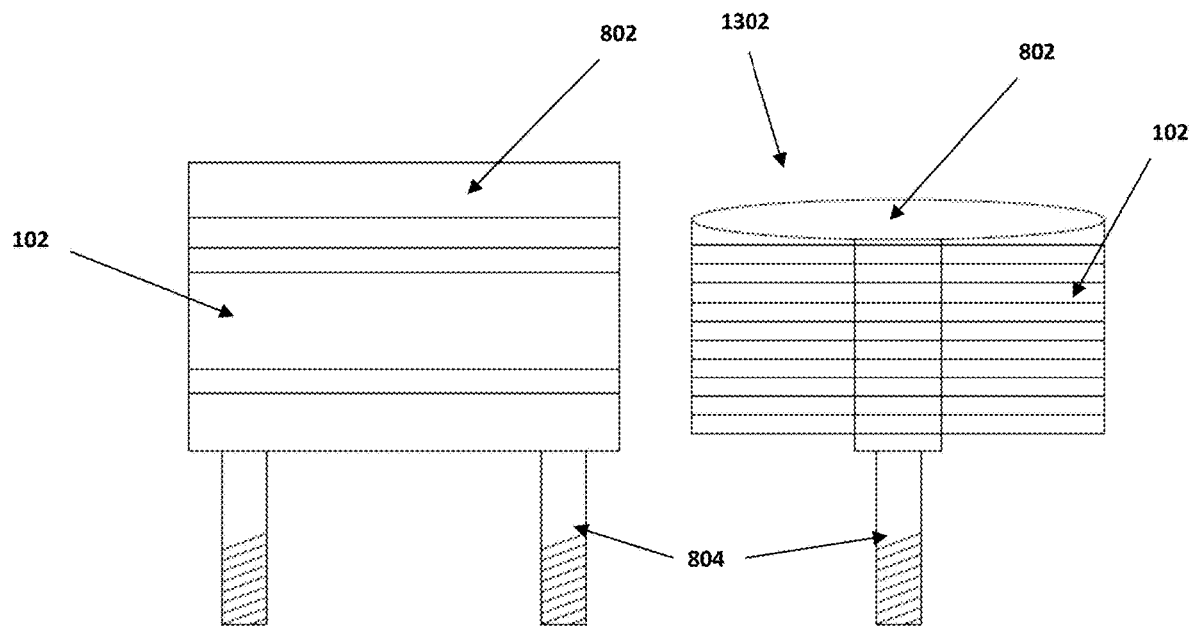
FIGS. 12-13 and 16 illustrate cross sections of the proposed composite windings, according to exemplary embodiments of the invention.

In one embodiment, the windings 102, have a rectangular nature, while in other embodiments they may be curved to match the diameter of the rotor 112, which leaving a number of gaps around the periphery of the stator 114. For mechanical reasons (FIG. 12), in one embodiment we fill these gaps between coils 102 out with phenolic materials 116.

Figure 8:
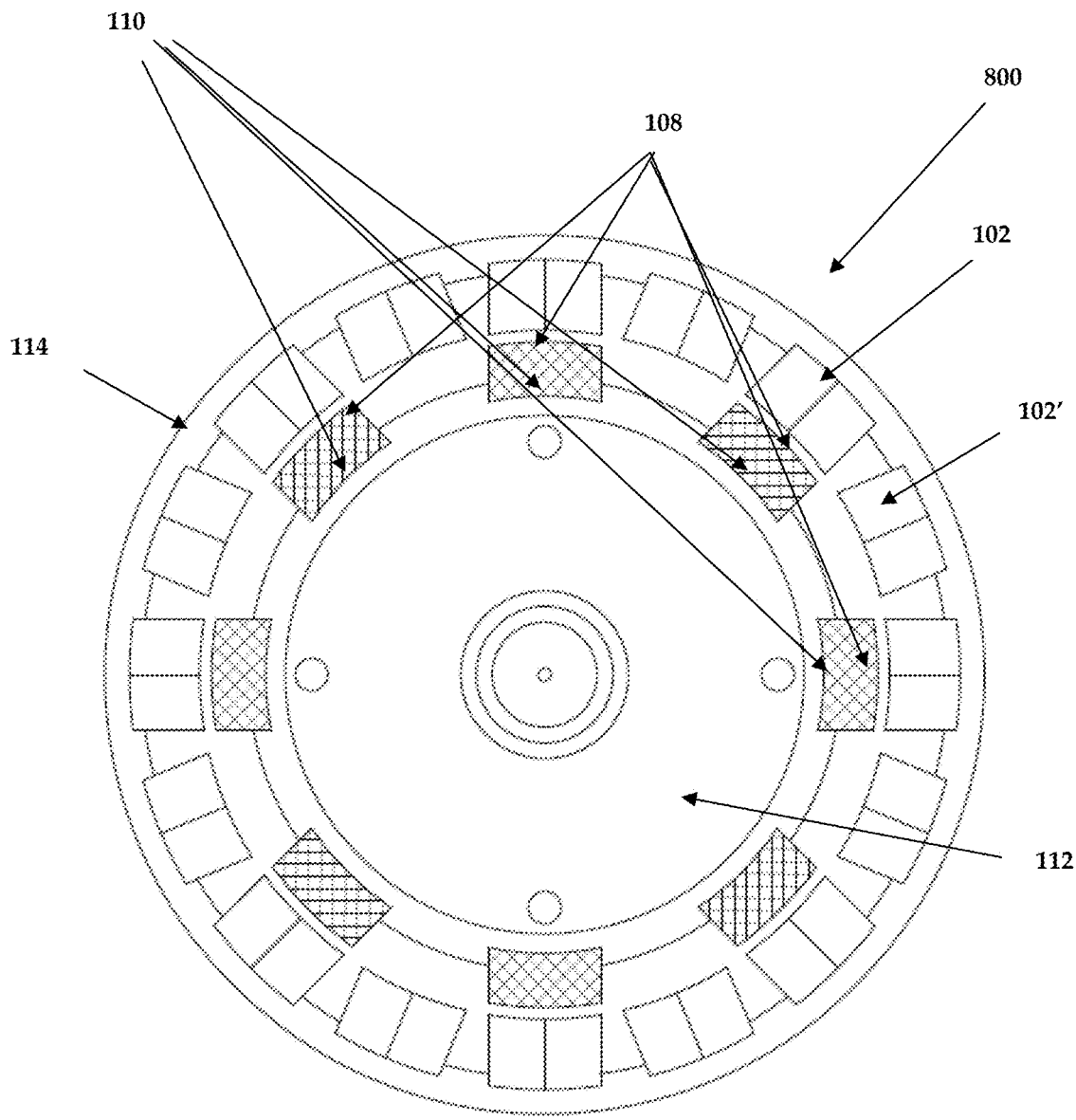
FIG. 8 illustrates a cross-section view of a proposed DC generator using the proposed composite block windings, according to an exemplary embodiment of the invention.

In one embodiment 700, each of the windings 102 are treated as an individual generator (FIG. 7), producing an independent voltage and current, that may be combined 702 as it outputs the assembly 100, or simply left individually. In particular, this arrangement allows for an electronic shifting of the generator load via electronic means (such as an electronic switch or electro-mechanical one), so that the generation may be adjusted to the load capacity (e.g. light day winds in a wind generator driven system), without expensive gears and transmissions. Whether the output is DC (FIG. 8) or alternating (so as to generate AC voltages and currents) as the N-pol 108 or S-pol 110 magnets go by the windings 102.

In another embodiment (FIG. 8), a purely DC generator is created, by utilizing similar polarity magnets (say all N-pol 108 or electromagnets) within the rotor 112, which when rotated induce their magnetic field into the plurality of winding 102 within the stator 114 (or vice versa, it's just simpler to rotate the non-wired components, but not impossible to do so). This generates a DC voltage and current within each coil 102. We note that the winding without a magnet temporarily facing it (such as the case of 102'), may be replaced by phenolic block if desired.

Figure 9:
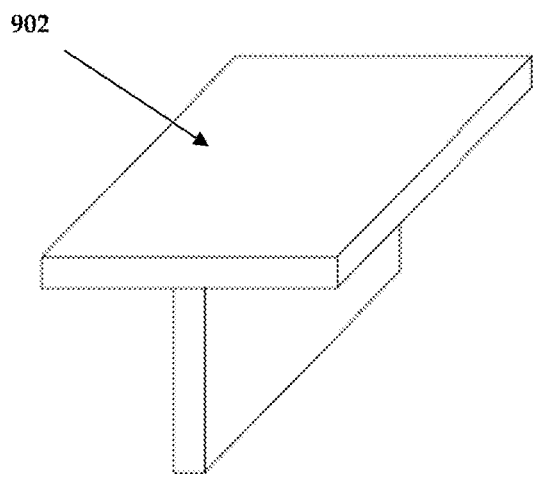
FIG. 9 illustrates a perspective view of an assistive ferrous material 'T', according to an exemplary embodiments of the invention.
Figure 10:
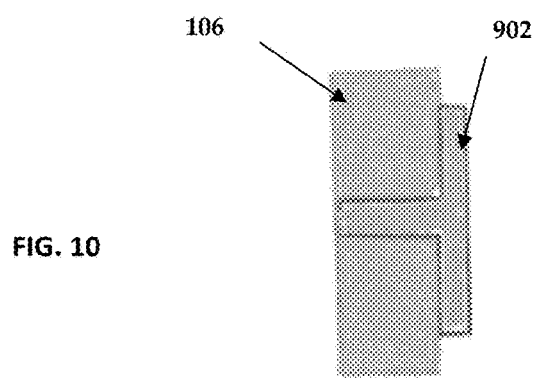
FIG. 10 illustrates a side view of a ferrous 'T' inserted within a permanent magnet, according to an exemplary embodiments of the invention.
Figure 11:
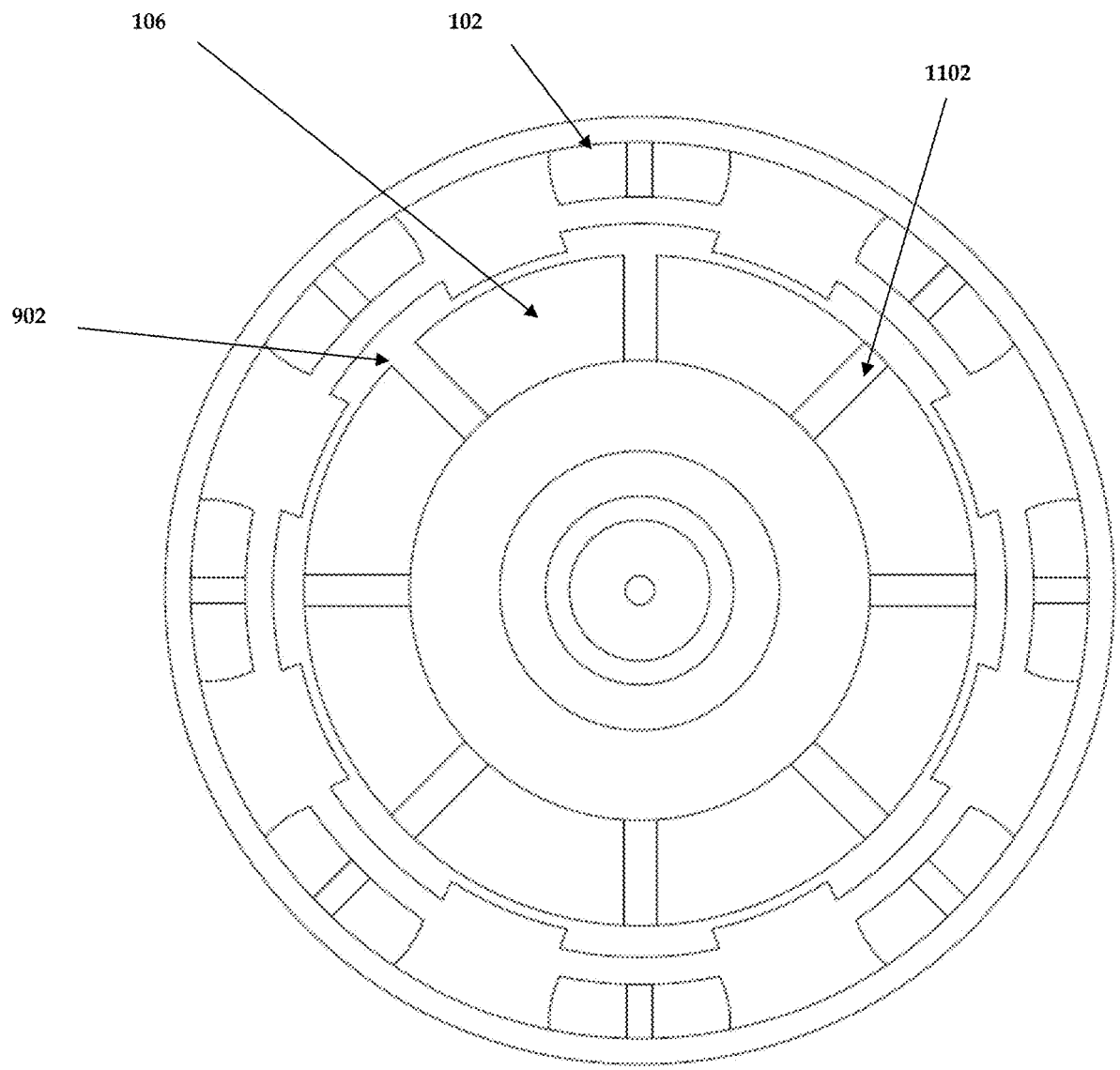
FIG. 11 illustrates a cross-section view of a proposed AC generator using the assistive 'T''s installed on the permanent magnets, according to an exemplary embodiment of the invention.

In one embodiment, the limited use of ferrous materials may be used. Such is the case seen on FIGS. 9-11, where the use of ferrous 'T' inserts structures 902 placed between the permanent magnets gap 1102 (where the similar N-pol or S-pol of adjoining permanent magnets meet results in significant advantages, by having the 'T' portion of the insert match that of the winding, 'extending' the effective surface of the magnets 106 within the rotor so that magnetic area affecting the coils 102 surface is larger.

The above generator led to an interesting development of a new type of engine which is a converter of static magnetic energy into dynamic mechanical energy by combining these Block-type windings with a ferrous core cap. In one embodiment, similarly to their use between magnets (FIG. 10), ferrous 'T' inserts structures 802, are placed (FIGS. 12-13) between the coils 102 to create a composite block-type winding 102 plus ferrous metal cap 802 to create a composite ferrous cap winding 1302. In particular, this allows the top surface area of the T insert to at one point match the area of the winding 102. The ferrous portion 802, is not only a plug, but shaped to act as a magnetic lens to the magnetic field coming from the permanent magnet 1410/1412. One such shape could be a shape complementary to the 'dome', like an arch. Another would be the aforementioned smaller areas for the dome 802 than for the windings 102.

Figure 14:
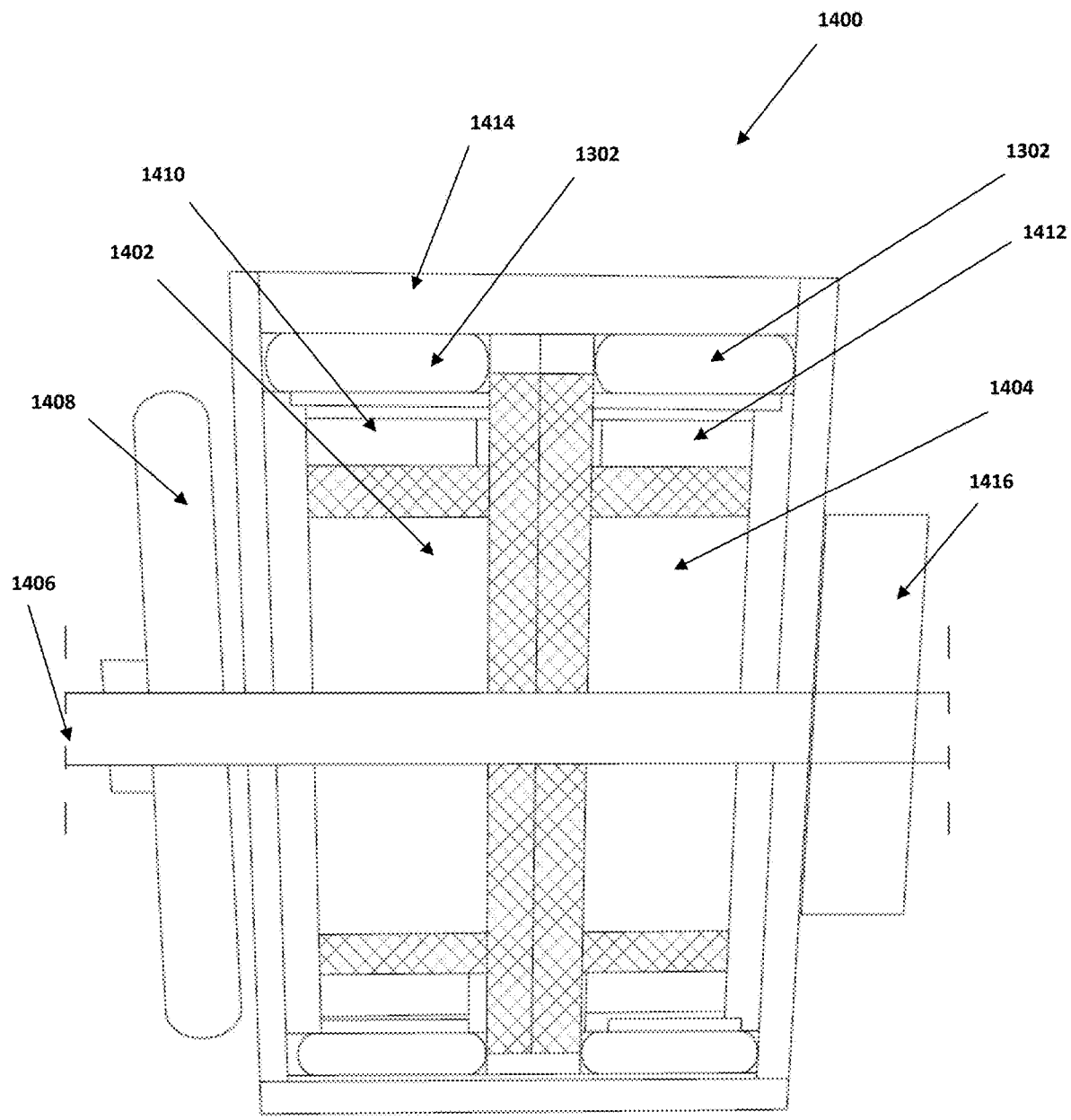
FIG. 14 illustrates a side view of a proposed converter of static magnetic energy into dynamic mechanical motion, according to an exemplary embodiments of the invention.
Figure 15:
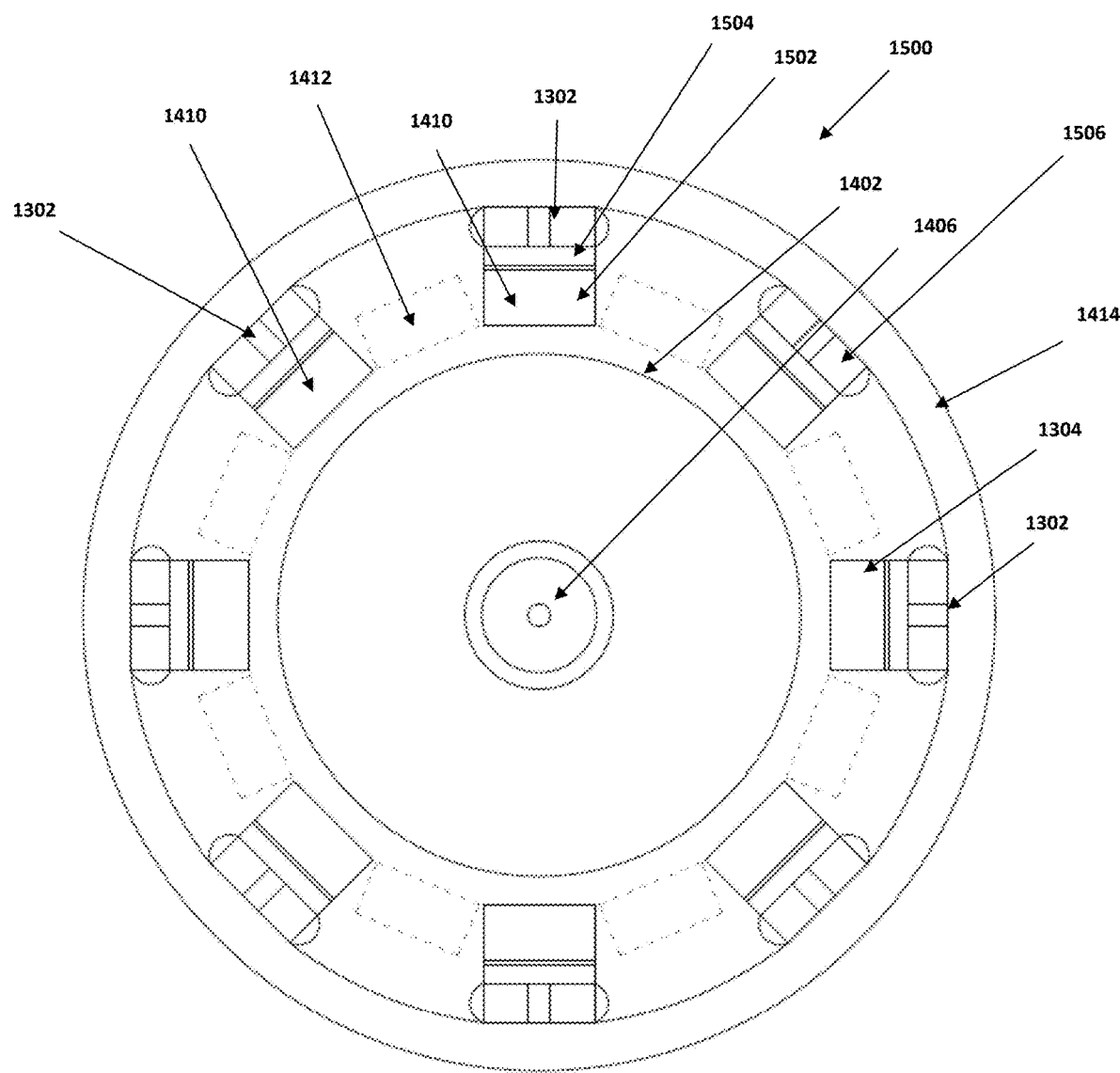
FIG. 15 illustrates a front view of a proposed converter of static magnetic energy into dynamic mechanical motion, according to an exemplary embodiments of the invention.

The combination composite ferrous cap winding 1302 is created from a winding 102 with ferrous components 802 are key to an embodiment we term radial, where a circular energy conversion system (FIGS. 14-15), shown in a cross view 1400 and a side view 1500. In such an embodiment, the composite ferrous cap winding 1302 is placed on the inside side of the stator 1414 (or vice-versa, but since the windings 102 need to be connected, this is mechanically simpler). Each of the two or more rotor assemblies (1402, 1404) is mechanically connected to a shaft/axle 1406 that freely rotates thanks to bearings (on each side), with an optional fly-wheel 1408. On the outside of the rotors 1402/1404, permanent magnets 1410/1412 are placed. These may be placed with alternate polarity or similar polarity facing the composite ferrous cap winding 1302.

Thus, when we see the cross section 1500, with the solid lines representing the elements of stator/rotor 1402, and the dashed lines representing the roto components of 1404, we see a system whose interconnected rotors 1402/1404 are 'staggered' (when two rotors by 45 degrees, when four are used by 22.5, etc.), so that the system does not 'lock up'. The offset radial distance X is equal to the circumference (360 degrees) divided by the total number of coils/magnets on a side. An equal number of magnets is placed on each side of said rotor, at the same offset radial distance X, with the difference being that the right and left are offset radial distance X/2 (one half of offset radial distance X) from each other.

Note that the magnet 1410/1412 may be exchanged with that of the winding 1302, so that the magnet is on the outside and the winding on the rotor. In such a case, as in traditional motors, the wiring to the windings 1302 may be accomplished by commutators at the base of the rotor.

In operation, the system described above 1400/1500 operates as a converter of magnetic potential to motion. A startup component 1416 (be it motor (battery, gas, hand crank) or simple mechanical motion) is connected to the shaft 1406, putting the rotors 1402, 1404 in motion, and with electronic controls that can sense the position of the shaft 1406 (and hence each rotor 1402 with respect to the stator 1414.

The converter operates on the basic principle of ferrous attraction to a magnetic field. We all know that the ferrous core 802 will be attracted to the magnet, but that a current running through the windings 102 in the correct direction will 'cancel' the magnet's attraction. In this fashion, through electronic control based on the position of the shaft 1406, we can turn the ferrous portion 802 of the composite winding into 'wood'. Half the time the ferrous portion 802 is being 'pulled' or attracted to the 'next' magnet (when the current is off), then as it passes the magnet and it would be 'braked' back, the current is turned on (first at maximum then less current as the rotation makes the ferrous portion 802 go away from the magnet), so that as the attraction begins from the next magnet in the stator, the ferrous portion 802 'runs downhill' to the next one.

In short, current is passed through the winding 102 in a direction as to create a magnetic field that cancels the 'attraction' from the magnet 'behind' the position of travel of the ferrous portion 102 and in a strength based on the distance to the magnet 'behind' (i.e. the farther, the smaller the current).

In one embodiment, when the 'half-way' distance is reached, the current may be zeroed, as the momentum of rotation will then move the ferrous portion 802 along, and accelerate it as the ferrous portion 802 gets closer to the magnet. In short, the motion is based on the gaussian strength of the ferrous portion 802 to the magnets 1410/1412, all downhill. If you want to slow the motion, cut the current to the system and the attraction of the magnet you just went by will slow you down. Speed up? Make sure the winding 102 current cancels the same ferrous portion 802 attraction to the magnets 1410/1412.

While the motion occurs, the windings 102 within the composite ferrous cap winding 1302 are energized for half the cycle, with sufficient current to create a magnetic field within the component to cancel the attraction the ferrous component 802 has to the rotor's magnet 1410. As the distance grows, this requires less energy, until at a point past the hallway point, no current is being used, and instead the rotor's 1402 rotation continues (and increases) as a function of the ferrous portion 802 beginning to exert an attraction on the next rotor magnet. (In FIG. 15, magnet in position 1502 going from being influenced by combination component 1504 to 1506 be 'attracted' by the next). So that the result motion being maintained by minimal current during half the cycle and 'free' converted magnetic energy to motion during the other half of the cycle.

Figure 16:
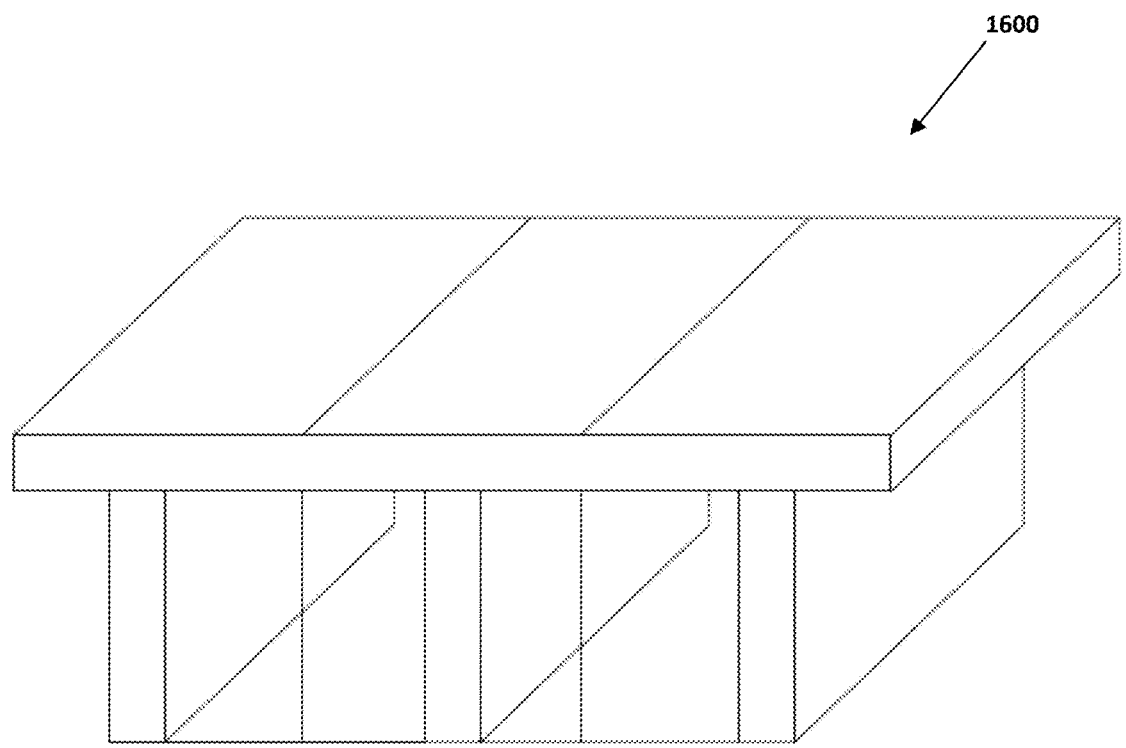
Figure 17:
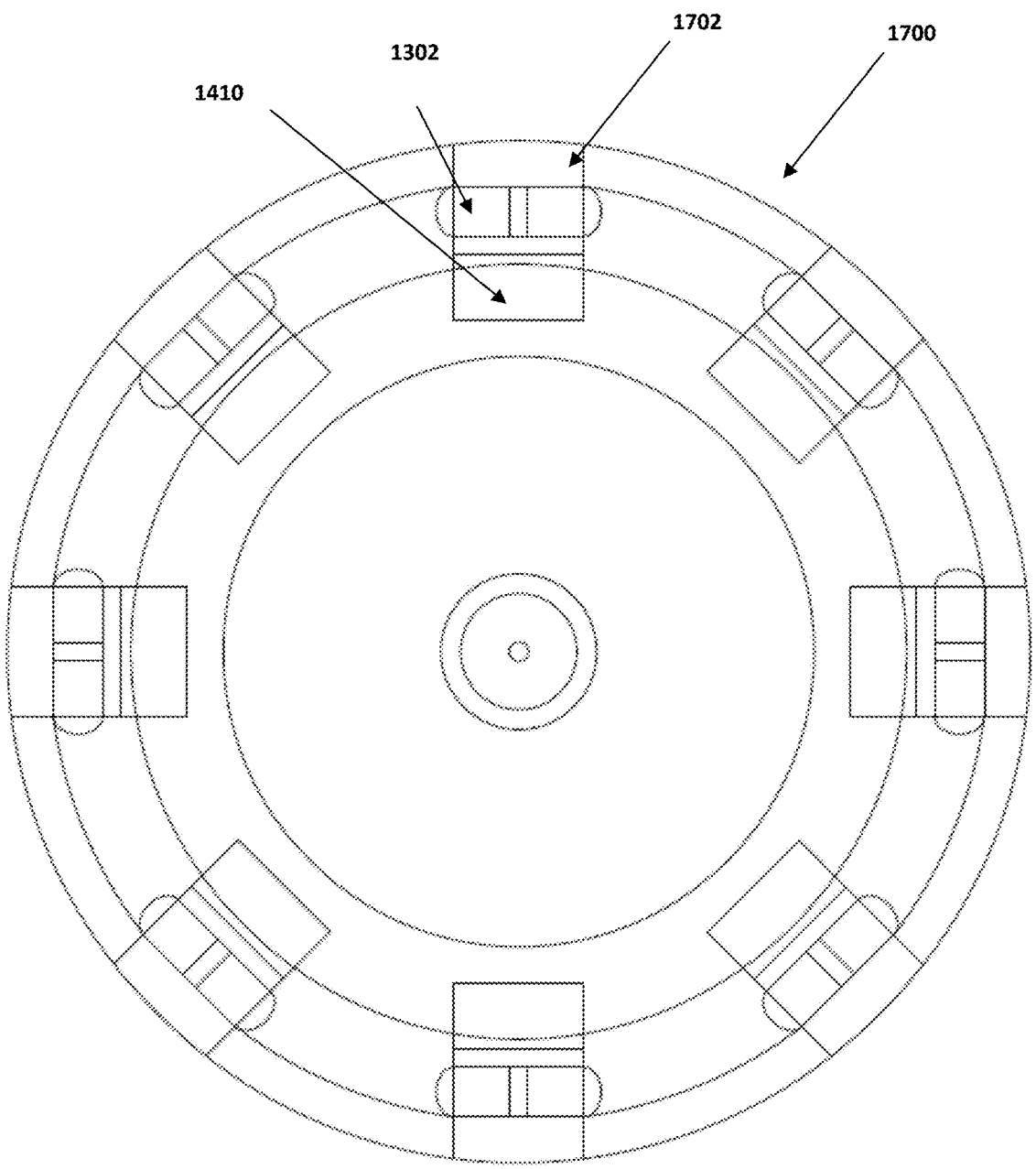
FIG. 17 illustrates a front view of a proposed converter of static magnetic energy into dynamic mechanical motion, according to an exemplary embodiments of the invention.

The magnets 1410 may be all the same polarity (in effect creating a DC system) or alternate ones, creating an AC system. In some embodiments (FIG. 16), multiple ferrous sections may be combined into one 1600. Similarly, 1700 (FIG. 17), opposite polarity magnets 1702 may be placed in the back of the ferrous portion, to augment the magnetic equivalence of the ferrous portion 802 of the composite ferrous cap winding 1302.

We again note that in the above design 1400/1500 shown are permanent magnets, although electromagnets may also be used. Similarly, the composite ferrous cap winding 1302 may be in the rotor, and the magnets in the stator (it's just that this complicates wiring). While the description above focuses on the block-type windings, we note that any other winding around the ferrous portion would work.

Figure 18:
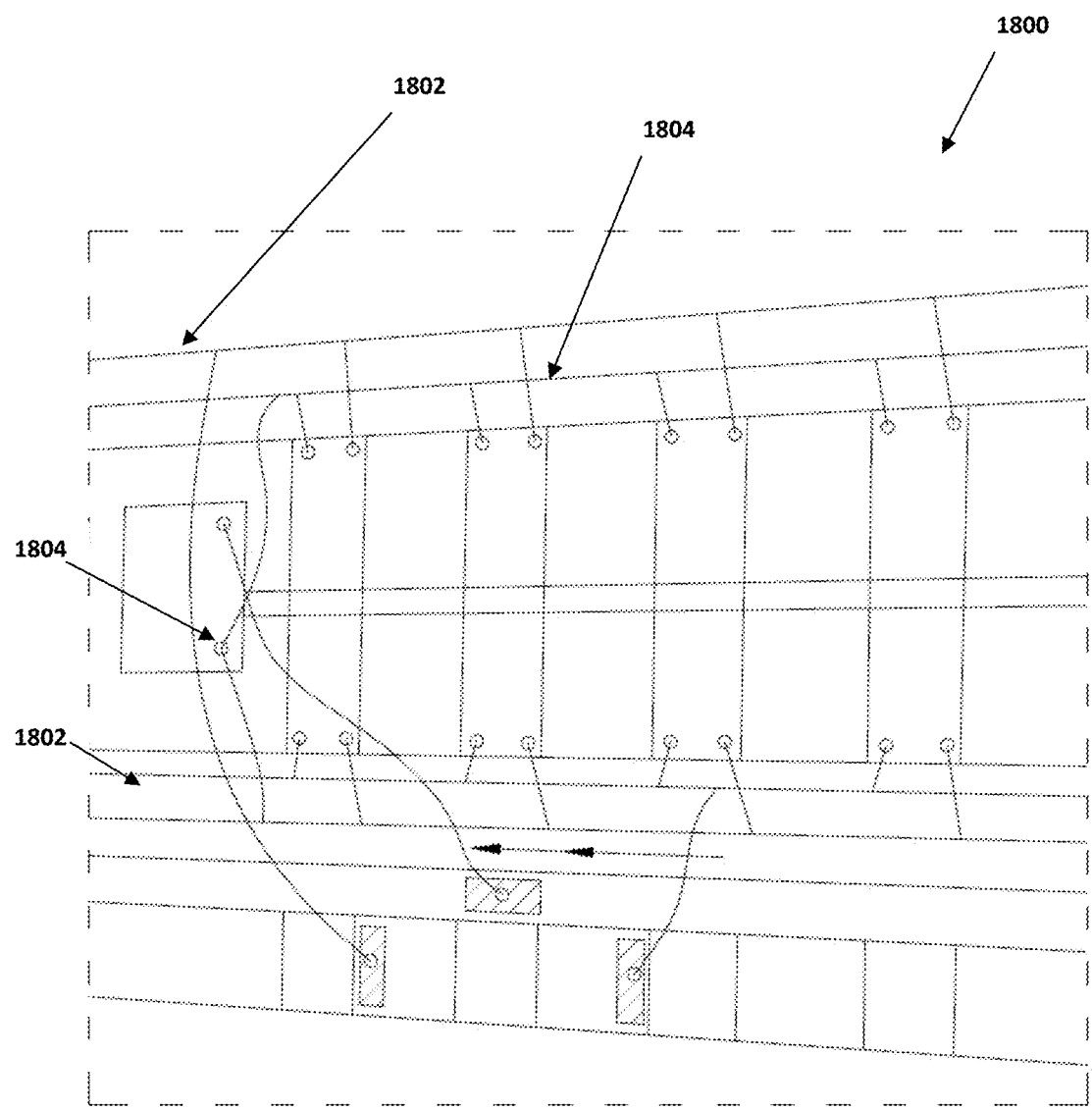
FIG. 18 illustrates a proposed electrical connection of the windings, according to an exemplary embodiment of the invention.
Figure 19:
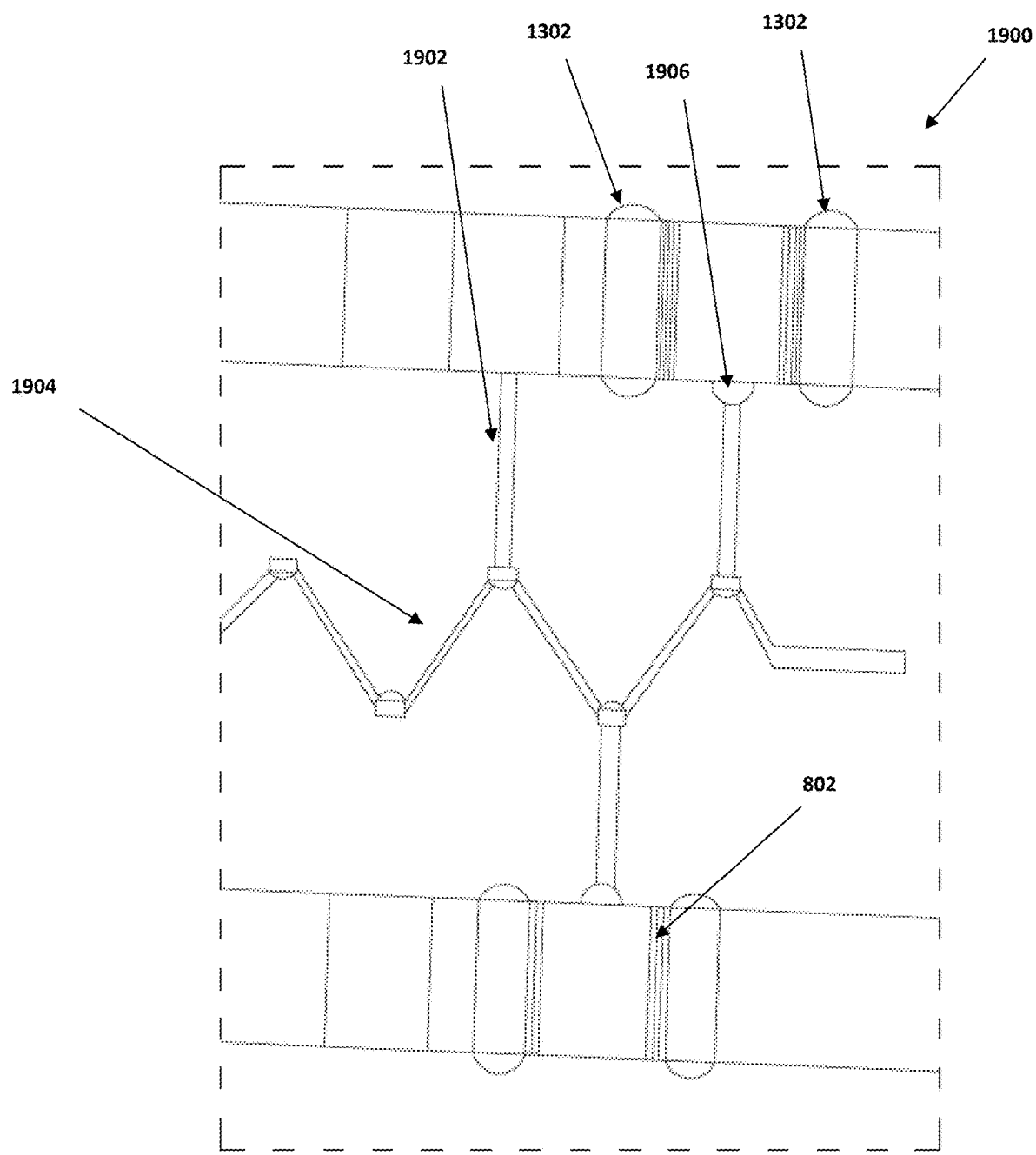
FIG. 19 illustrates a side view of a proposed converter of static magnetic energy into dynamic mechanical motion using a camshaft and linear displacement, according to an exemplary embodiments of the invention.
Figure 20:
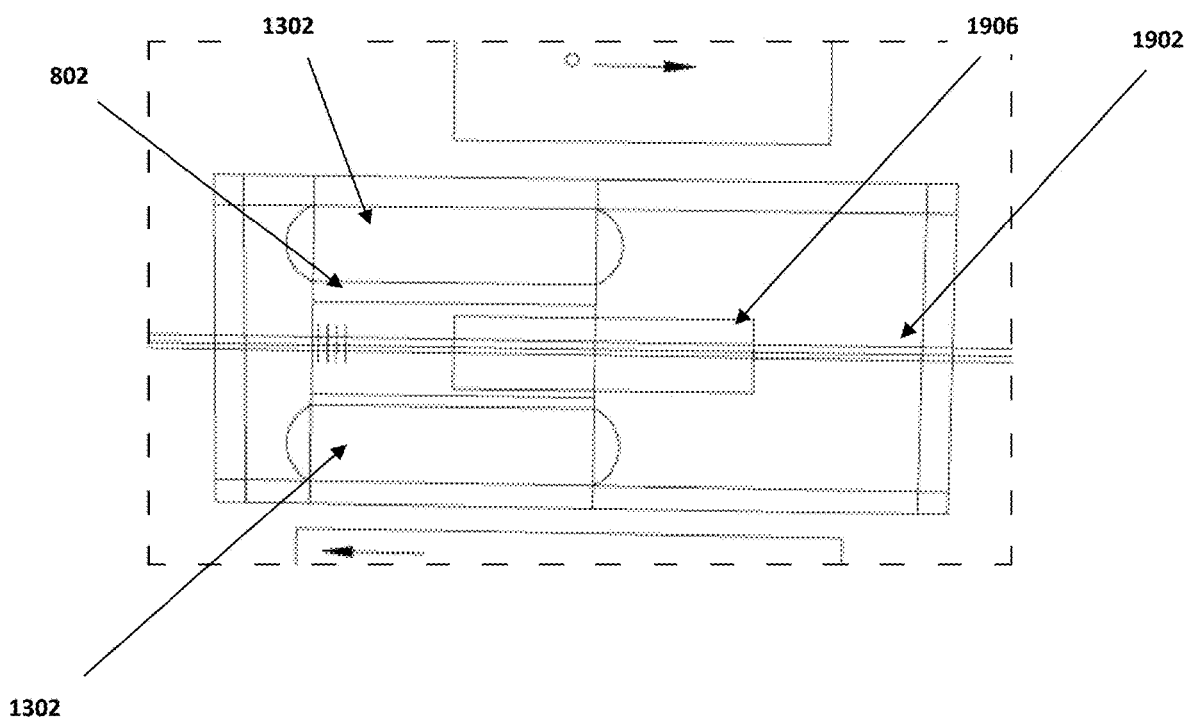
FIGS. 20-23 illustrate various views of a proposed converter of static magnetic energy into dynamic mechanical motion using linear displacement, according to an exemplary embodiments of the invention.
Figure 21:
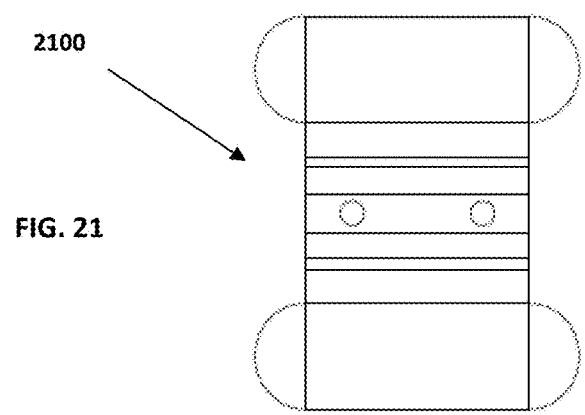
Figure 22:
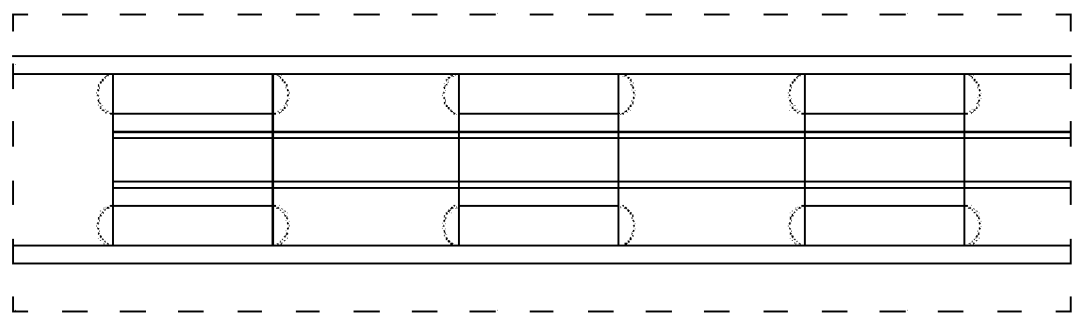
Figure 23:
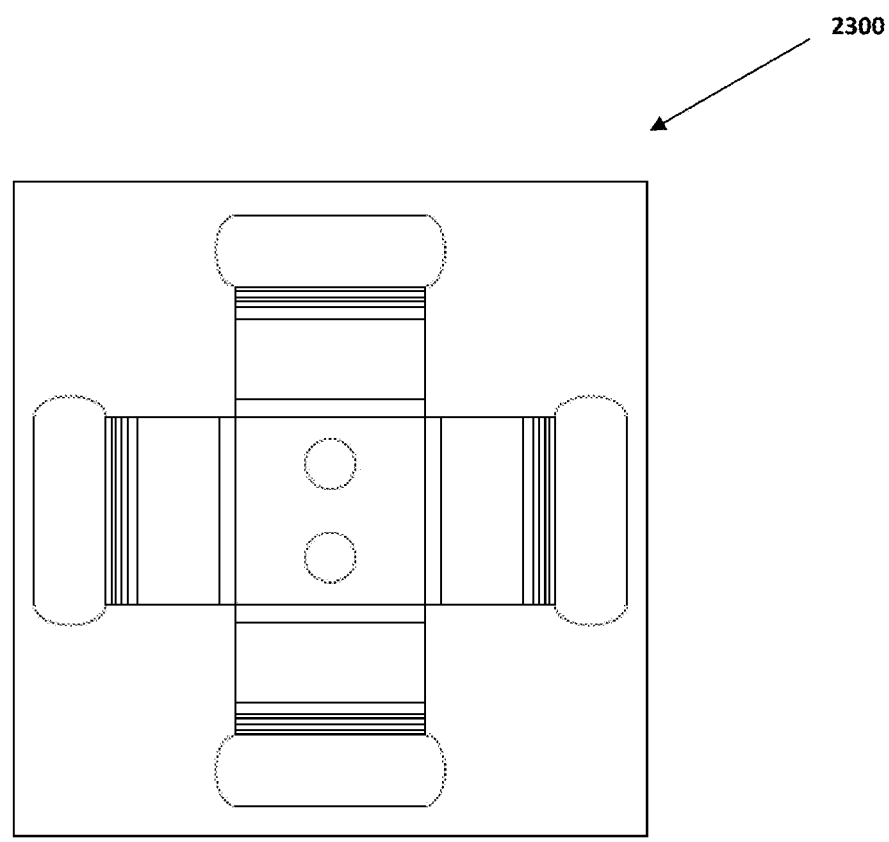

FIG. 18 illustrates one proposed embodiment of the wiring 1800 of the coils 102, which allows for the currents that provide the iron core 802 within the composite ferrous cap winding assembly 1302 to have magnetic attraction neutralization on each of the coils 102. In this fashion, the circuit 1802 cancels the magnetic attraction to the magnets 1410 on one rotor 1402, and those that are generated 1804 cancel that for the magnets 1412 on the other rotor 1404.

The disconnection from one circuit 1802 to the other 1804 may be accomplished by simple brushes, or via an electronic switching system based on the shaft 1406 position, as well as on the speed and load on the system. We note that the circuit of the coil 102 within the composite ferrous cap winding 1302 not being used to neutralize the respective iron cores 802, is left open, thus minimizing/eliminating the current on that coil, and hence the magnetic induced field.

Finally, the moment when the currents go from being retrieved to being induced, presents a 'shocking moment', where the system could stammer. As was done with steam engines, we propose to resolve this 'shock' by adding a flywheel 1408, which will impose its dynamic energy and keep the system rotating. A similar arrangement could be accomplished with a crankshaft having weights opposite of that 'frozen' position.

In another embodiment, which we term a linear embodiment, the motion of the permanent magnets 1902 moving relative to composite ferrous cap winding 1302 in a linear 'back and forth' fashion (FIGS. 19-23). In one embodiment, 1900 one or more magnet/winding 902/1302 assemblies are connected through individual rods 1902 to a camshaft 1904 to replicate the piston's up/down motion in an internal combustion engine. In this case, the camshaft would be moved by an external mechanism until reaching the critical momentum rotation rate, with the magnets 1906 coming across the fixed composite windings 1302. In effect, the component moving the rod 1902 up/down is inside a 'sleeve' formed by the stator component 1302. Notice the motion need not be limited to two sides 2100, but may be four sided 2300, with the motion occurring in/out of the page as shown. As before, in an alternate embodiment, the winding 1302 may be moving with the magnets 1906 fixed.

As before (FIG. 20), when the magnet 1906 moves towards the ferrous portion 802 of the composite winding 1302, the attraction conveys a 'pull' on the camshaft, moving the camshaft, and when the magnet passes the center and begins to be 'slowed down', the current on the winding 102 part of the composite winging 1302 proceeds to convert the ferrous portion 802 into wood (by canceling the magnetic field), allowing the motion to continue until the travel starts 'back', at which point the 'pull' helps the camshaft motion until past the middle point and the cancelling process is repeated.

Figure 24:
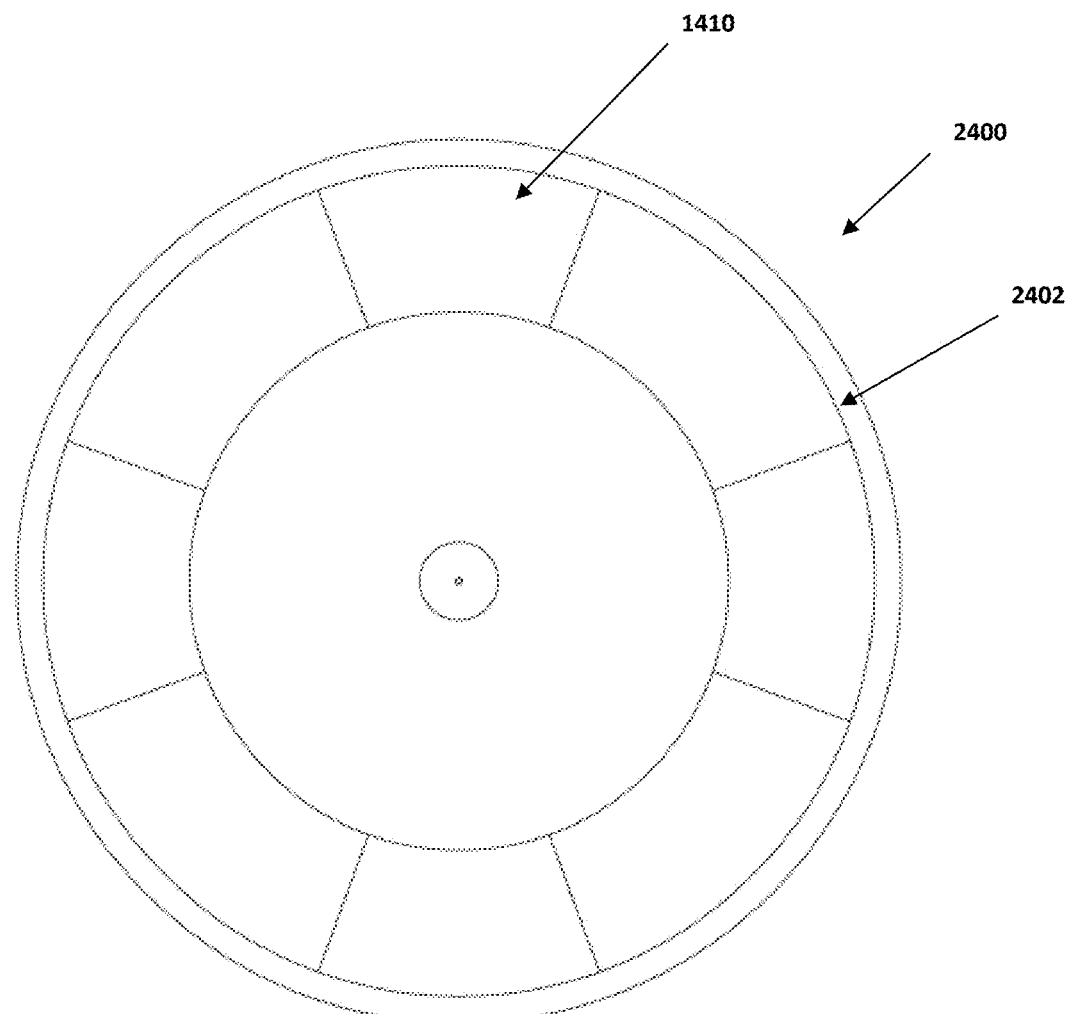
FIGS. 24-27 illustrate various views of a proposed converter of static magnetic energy into dynamic mechanical motion using flat discs, according to an exemplary embodiments of the invention.
Figure 25:
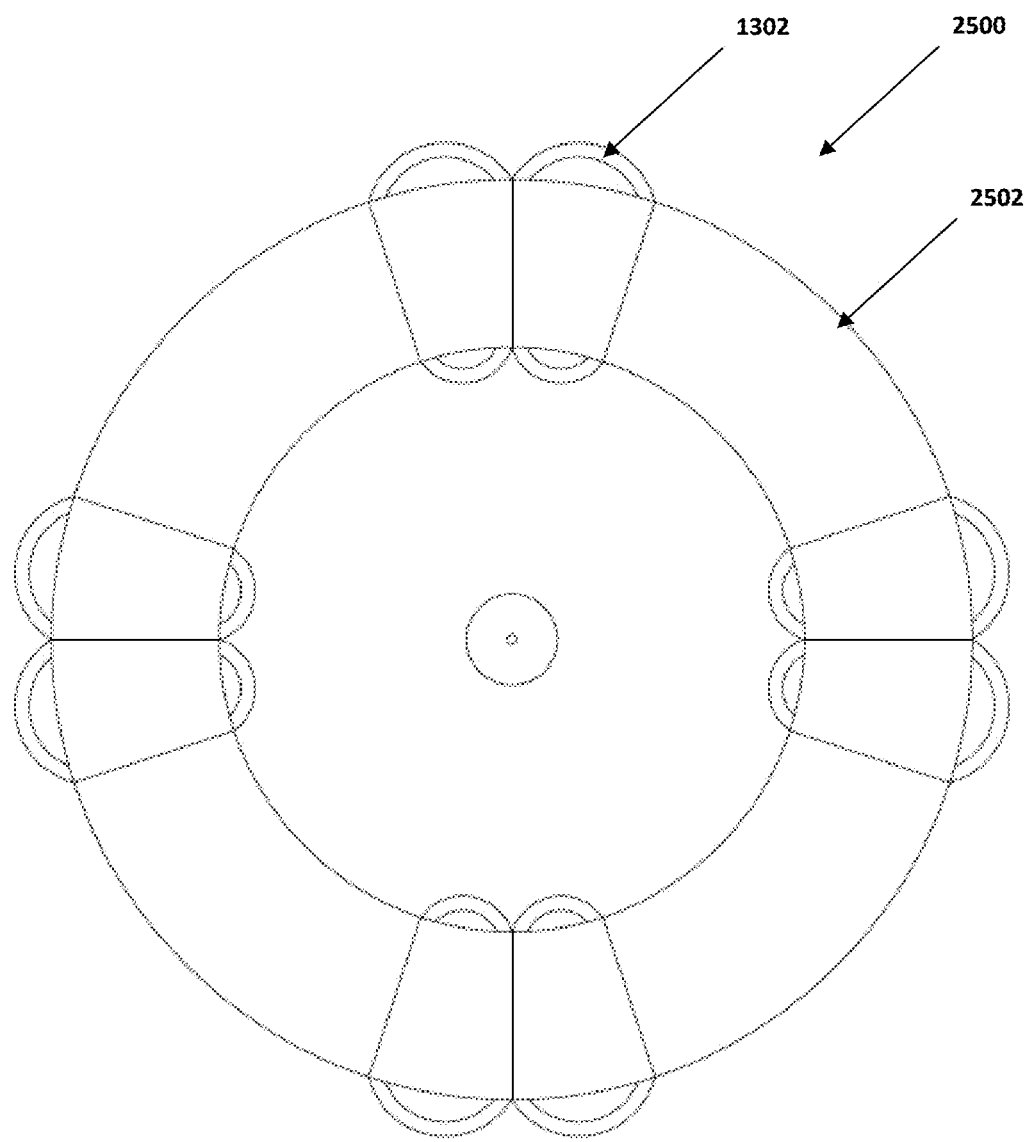
Figure 26:
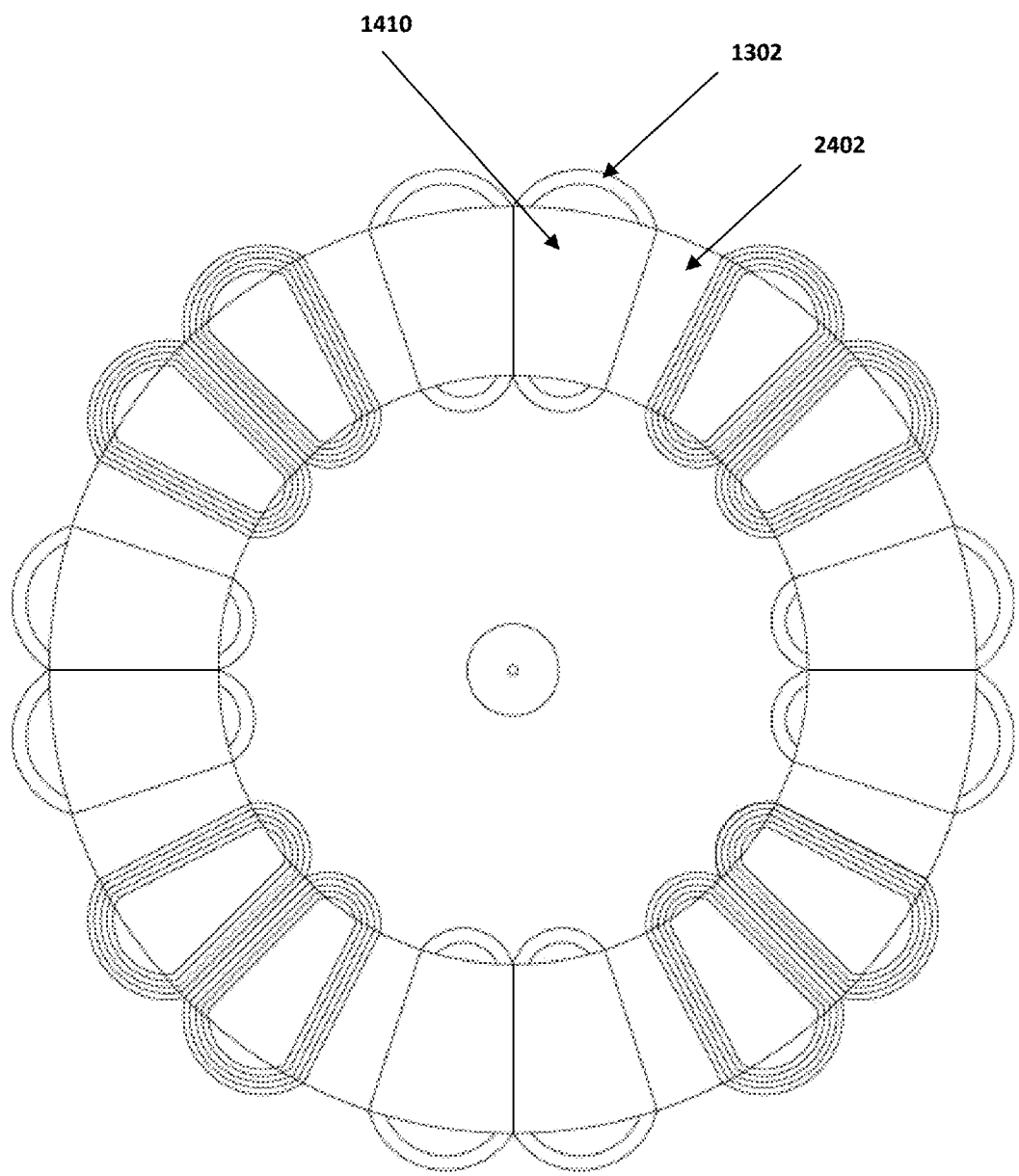
Figure 27:
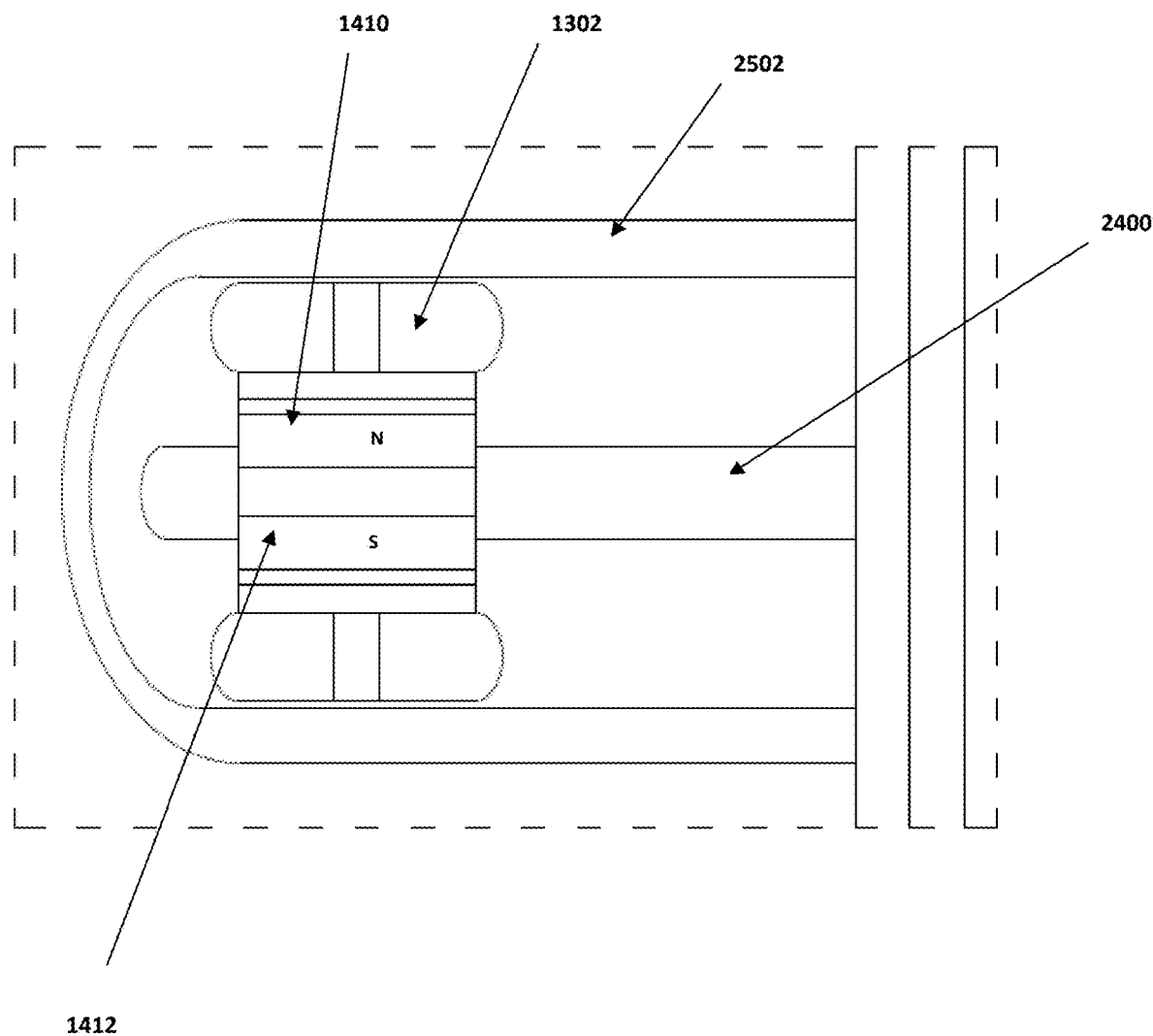
Figure 28:
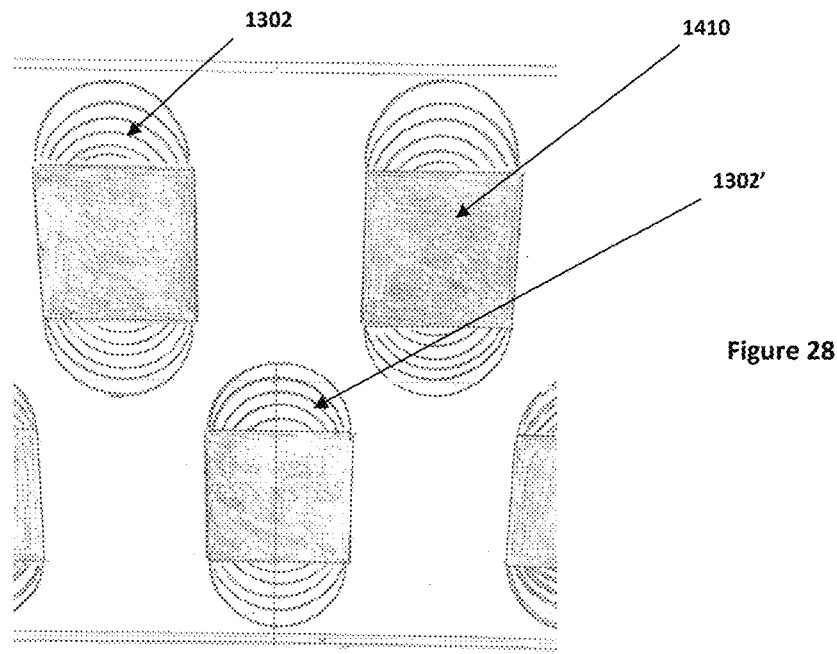
FIGS. 28-29 illustrates cross sections of the placement of the proposed composite block windings, according to exemplary embodiments of the invention.
Figure 29:
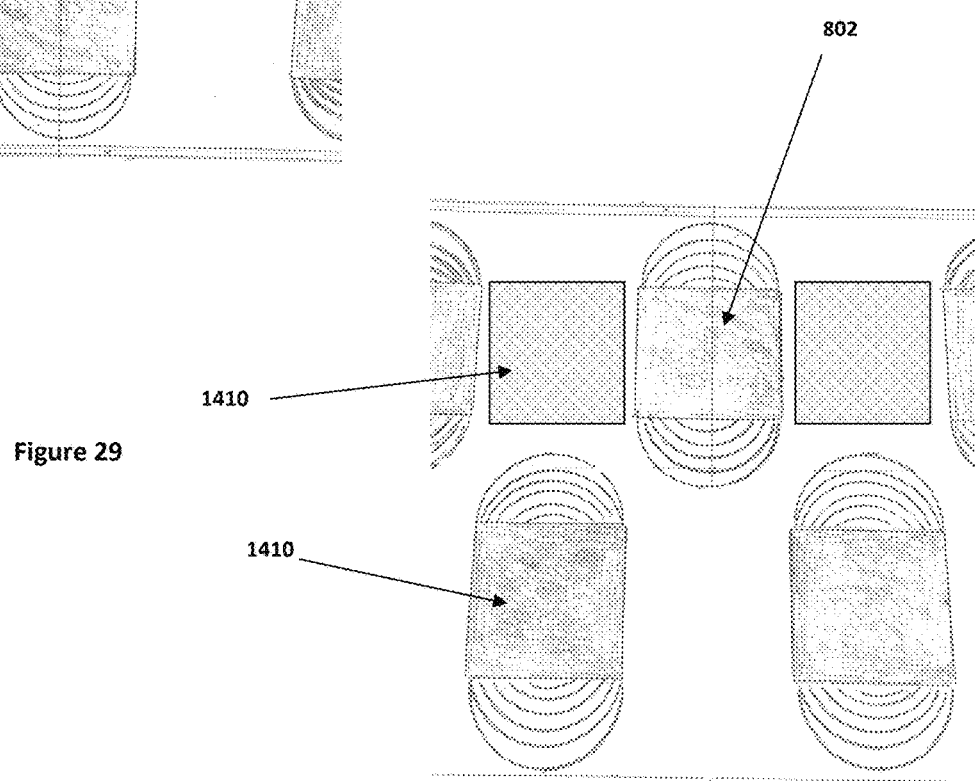
Figure 30:
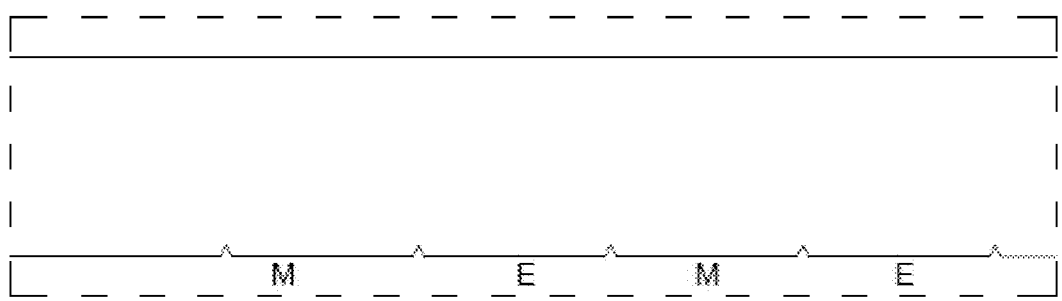
FIGS. 30-32 illustrate views of various other system components, according to exemplary embodiments of the invention.
Figure 31:
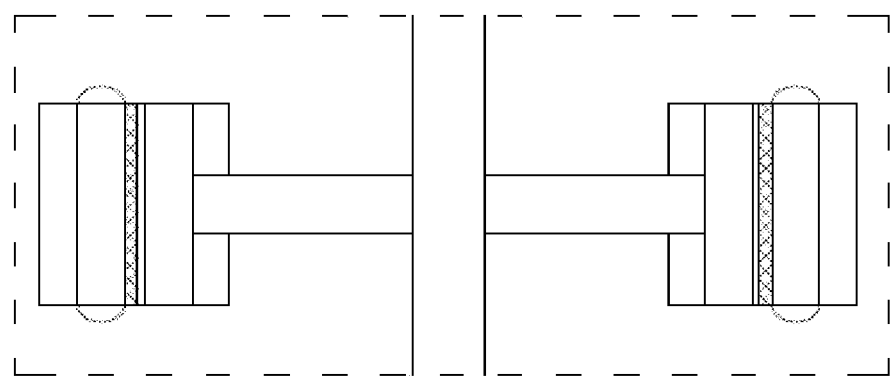
Figure 32:
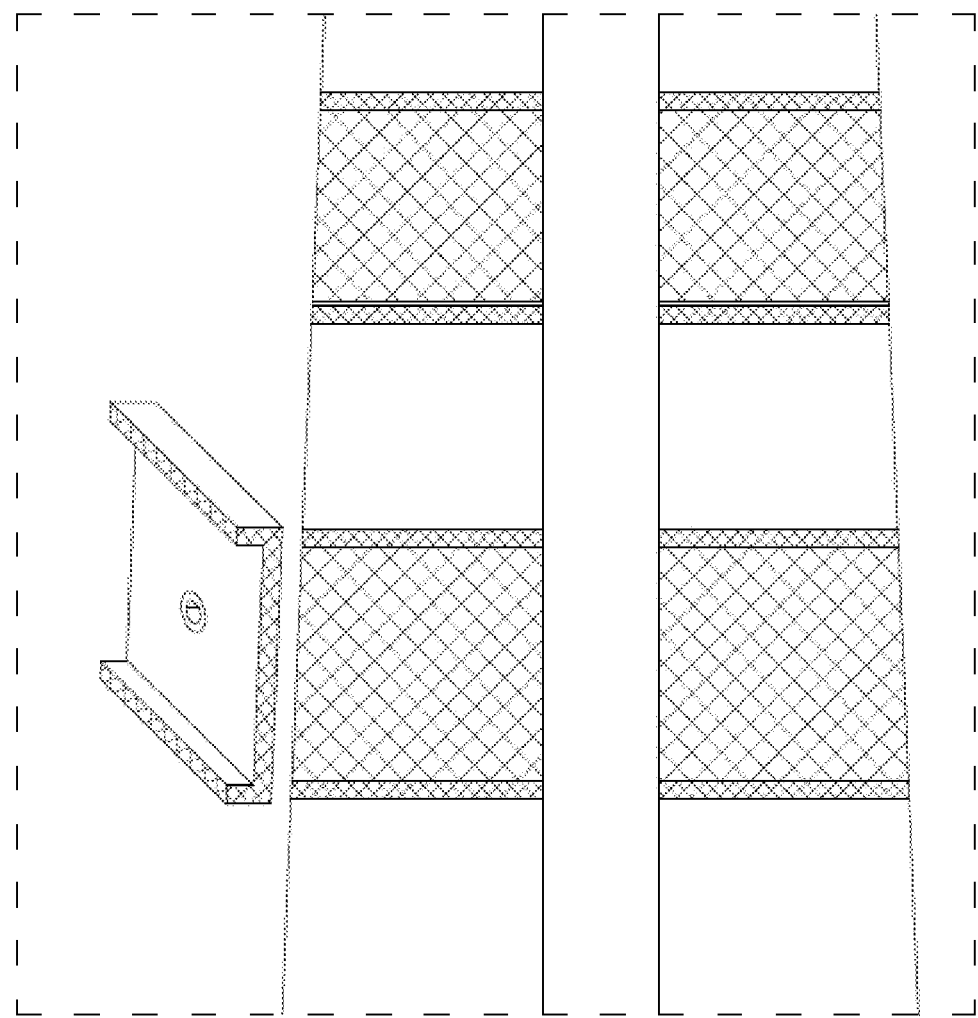

In yet another embodiment, which we term circular, the configuration of the system is that of discs, but with the magnets 1410/1412 and composite ferrous cap winding 1302 mounted not at the end of the rotor or disk 2400 (like FIGS. 14-15), but along the fascia of the discs 2400 as well as along the internal fascia of the covers 2502 on one (FIGS. 24-25) or both sides (FIGS. 26-27), as well as along one radial distance from the shaft 1406 or multiple distances. Note that the disc configuration, may not be limited only a 'strata' or portion along the disc, but may also (FIGS. 28-29) include layers of composite ferrous cap winding 1302/1302' and magnets 1410/1410' located at different radial distances along the disc (FIGS. 28-29).

In one embodiment, the disc 2400 rotates, passing the magnets 1410/1412 across the composite windings 1302, with the similar effect. As the magnet being rotated approached the ferrous portion 802, it is 'pulled', and once it passes, the current is applied to the windings as a function of the distance to the ferrous portion, effectively cancelling the 'braking action' and allowing the free movement. As before, to let the unit accelerate, simply cancel the breaking action by applying full ferrous 802 cancelation, or allow it to slow down/brake by reducing the ferrous 802 cancellation of the current on the windings. Similarly, as before, the magnets 1410/1412 may be fixed and the composite windings 1302 moving.

EXAMPLE

In operation, we have assumed 40% efficiency of the coils (a lower-than-expected number) in an experimental setup of the system above. In it we have been able to have the system remain in rotation while outputting 133 W of output through the shaft 1406 and consuming 120 W of electrical power (to neutralize the magnetic braking) at 375 RPM. We note that the output at the shaft 1406 continues to grow as the speed increase further.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. A method to generate torque on a shaft using a converter of static magnetic energy into dynamic mechanical energy having composite ferrous cap windings, said method comprising:

providing a rotating camshaft located centrally, said rotating camshaft having two or more pairs of magnetic field generating components, each said magnetic field generating component placed opposite another magnetic field generating component and each connected to said camshaft via an extending rod;

wherein each said magnetic field generating component is comprised of a sleeve having one or more composite ferrous cap assemblies within and along the sides of said sleeve, each said composite ferrous cap assembly comprised of a tightly coiled conductive insulated wire that is wound in a smooth oval pattern with no sharp turns and then dipped in a resin, plus a ferrous metal 'T' insert structure placed within the center of said winding assembly and a permanent magnet connected to said extending rod so that said permanent magnet moves in/out of said sleeve along the side of the metal 'T' insert as said camshaft rotates;

providing a shaft connected to said camshaft and coupled to external mechanical rotation components, said shaft containing mechanical/electronic components to determine said shaft rotation position;

providing electrical control circuits so that each said composite ferrous cap assembly receives current based on the shaft position so as to create a magnetic field around said composite ferrous cap assembly that cancels the attraction or rejection on the permanent magnet at the end of the extended rod exiting the sleeve; and operating said external mechanical rotation component.

2. The converter of claim 1, wherein:
said winding wire is comprised of all or part of:
copper, aluminum or a mixture of either.

3. The converter of claim 2, wherein:
all the magnets connected to the rods are the same polarity.

4. The converter of claim 2, wherein:
the magnets connected to the opposite placed magnetic field components are of alternate polarity.

5. The converter of claim 1, wherein:
all the magnets connected to the rods are the same polarity.

6. The converter of claim 1, wherein:
the magnets connected to the opposite placed magnetic field components are of alternate polarity.

* * * * *